Aug. 8, 1967    C. BRONGERSMA ETAL    3,335,304
ELECTRIC MOTOR BRAKING MECHANISM
Filed Jan. 27, 1964    3 Sheets-Sheet 1
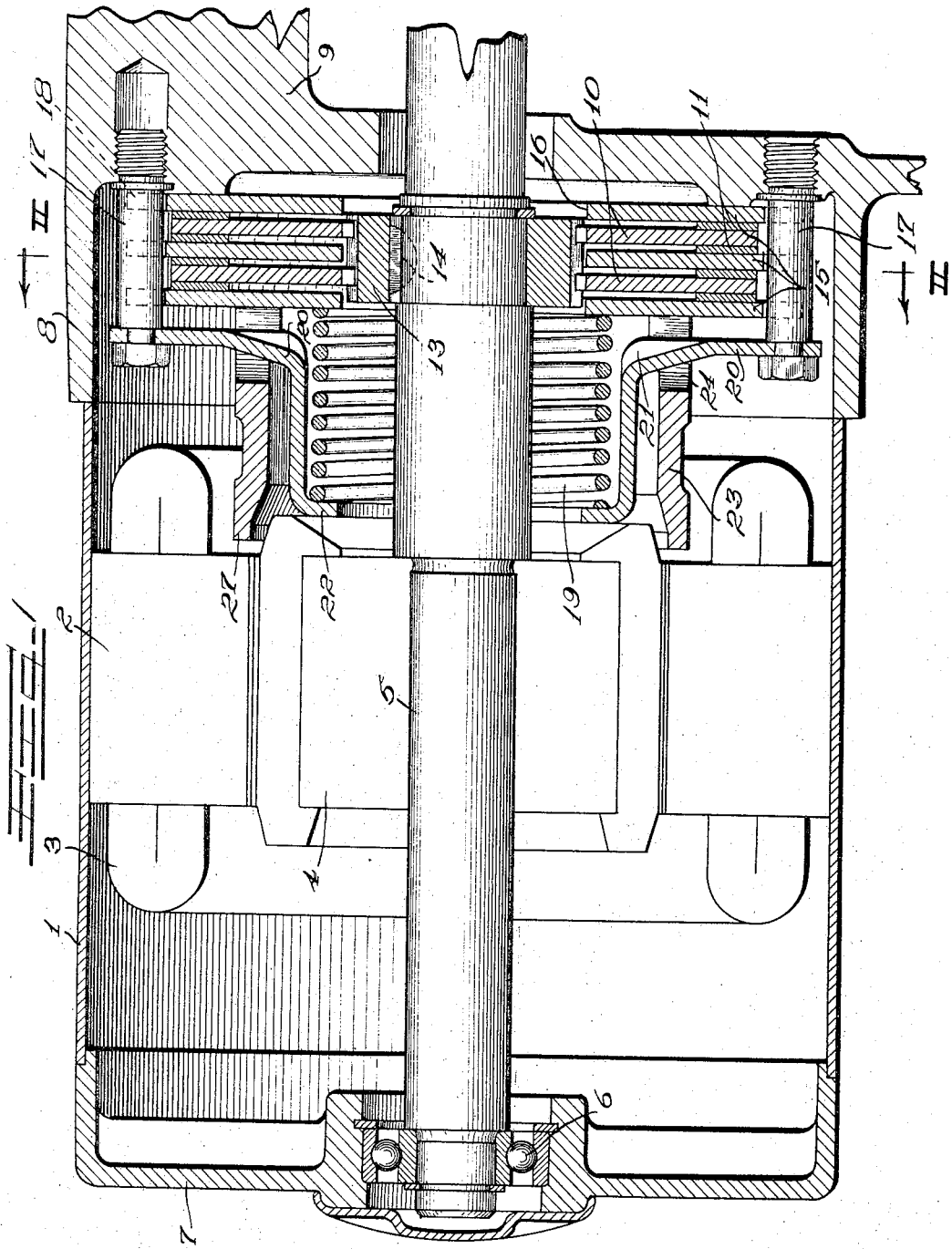
INVENTOR.
Cornelius Brongersma
Howard C. Stevens Jr.
ATTORNEYS

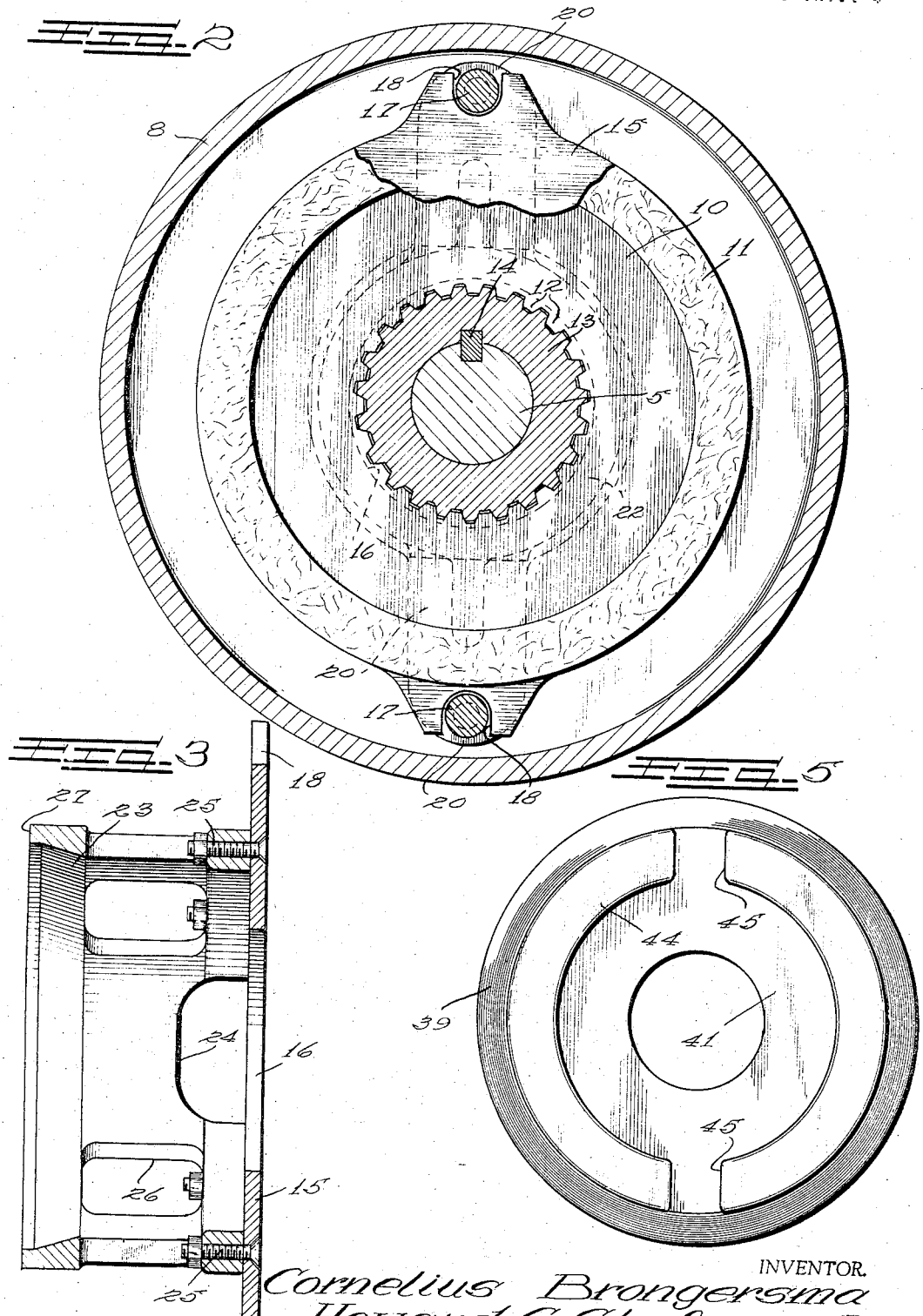

Aug. 8, 1967  C. BRONGERSMA ETAL  3,335,304
ELECTRIC MOTOR BRAKING MECHANISM
Filed Jan. 27, 1964  3 Sheets-Sheet 2
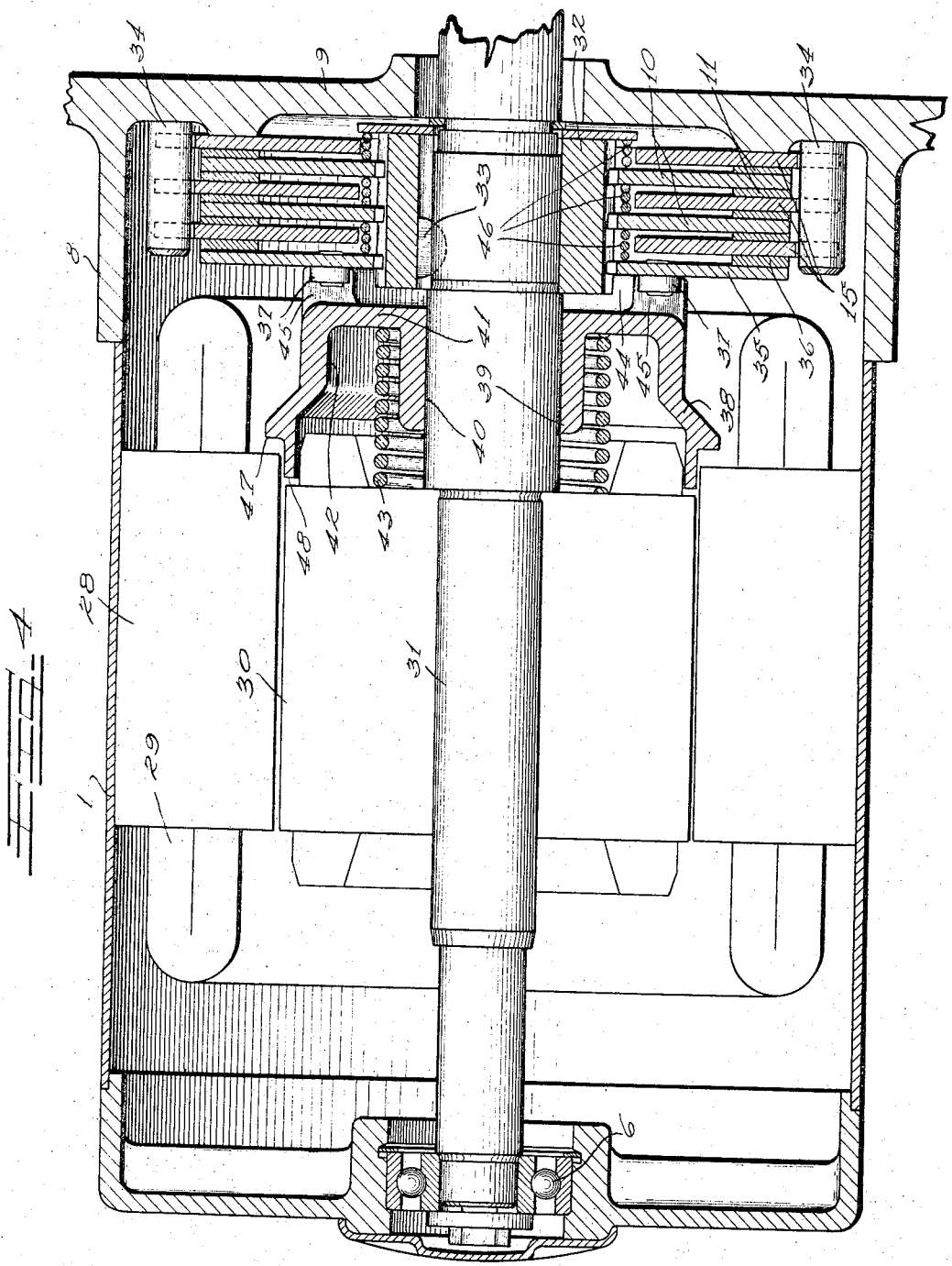
INVENTOR.
Cornelius Brongersma
Howard C. Stevens Jr.
ATTORNEYS United States Patent Office 3,335,304
Patented Aug. 8, 1967

3,335,304
ELECTRIC MOTOR BRAKING MECHANISM
Cornelius Brongersma, Spring Lake, and Howard C. Stevens, Jr., Muskegon, Mich., assignors, by mesne assignments, to Dresser Industries, Inc., Dallas, Tex., a corporation of Delaware
Filed Jan. 27, 1964, Ser. No. 340,356
4 Claims. (Cl. 310—77)

ABSTRACT OF THE DISCLOSURE

This invention relates to a motor braking mechanism that is automatically applied when the motor is deenergized to stop rotation of the motor drive shaft. The brake mechanism remains applied until the motor is again energized. The braking mechanism is a reciprocating plunger that is responsive to the magnetic field set up in the motor when the motor is energized. The plunger releases the braking elements and compresses a spring wound coil when it is energized by the flux field.

---

This invention relates to improvements in electric motor braking mechanism, and more particularly to a braking mechanism intimately associated with an electric motor, which mechanism is automatically applied when the motor is deenergized to stop rotation of the motor drive shaft, and which mechanism remains applied until the motor is again energized, the mechanism being suitable for use in conjunction with motors of various types, as will be apparent to one skilled in the art.

In the past, many and various types of motor braking mechanisms acting in response to the magnetic fields set up in the motor when the same is energized have been developed. In most cases, however, these formerly known structures were not as economical as desired owing to the use of expensive bearings, expensive but essential machining and finishing of parts, the use of guide pins or equivalent means for keeping the plunger in alignment with other parts, possessed an objectionable amount of inertia tending to slow the effective action of the various parts, and were objectionably short lived.

With the foregoing in mind, it is an important object of the instant invention to provide braking mechanism associated with an electric motor, which braking mechanism embodies fewer parts than were heretofore utilized, is quick and positive in action, is of an extremely simplified construction eliminating the necessity of many machining and finishing operations, which is economical to produce, and which is extremely long lived.

Another important object of this invention resides in the provision of an electric motor braking mechanism in which a plunger, responsive to the magnetic fields set up in the motor to release the specific braking elements, is so mounted that sliding friction is reduced substantially to a minimum.

Also an object of this invention is the provision of electric motor braking mechanism embodying a reciprocatory plunger responsive to a magnetic field set up in the motor when the same is energized and which is so mounted and associated with other parts of the structure to insure maximum engagement of the plunger with a part of the motor when the specific braking elements are released.

It is also a feature of this invention to provide electric motor braking mechanisms including a plunger responsive to the magnetic field of the motor so arranged as to eliminate any need of guide pins or other directive or added stabilizing means to insure proper movement of the plunger.

Still another desideratum of this invention is the provision of electric motor braking mechanism so constructed as to effect a considerable reduction in inertia in comparison with braking mechanisms heretofore developed and particularly in comparison with previously used cone type braking means.

Still a further feature of the invention resides in the provision of electric motor braking mechanism in which the spring that urges the braking elements into engagement is so housed as to eliminate the possibility of having the spring wind up or coil from its original state due to non-uniform turning speeds of parts associated with the spring.

While some of the more salient features, characteristics and advantages of the instant invention have been above pointed out, others will become apparent from the following disclosures, taken in conjunction with the accompanying drawings, in which:

FIGURE 1 is a fragmentary central vertical sectional view through an electric motor assembly equipped with braking mechanism embodying principles of the instant invention, parts being shown in elevation;

FIGURE 2 is a transverse vertical sectional view taken substantially as indicated by line II—II of FIGURE 1, looking in the direction of the arrows; parts being broken away to reveal parts therebehind;

FIGURE 3 is a reduced fragmentary vertical sectional view through the plunger and first braking disc, this section being taken at a slightly different angle from the position of these parts in FIGURE 1;

FIGURE 4 is a view similar in character to FIGURE 1, but showing a braking mechanism of slightly different construction; and FIGURE 5 is an end elevational view of the plunger alone of the structure of FIGURE 4 taken from the right-hand side of FIGURE 4.

As shown on the drawings:

In both illustrated embodiments of the instant invention, the internal motor structure including the windings and laminations of the rotor and stator are diagrammatically illustrated only, since such structure is well known in the art.

With reference now more particularly to FIGURES 1, 2 and 3, it will be seen that the first illustrated embodiment of the instant invention is shown associated with an electric motor including a housing or shell 1, stator laminations 2 and a stator coil 3 mounted therein in a known manner. Inside the hollow of the stator assembly is a rotor 4 keyed to a shaft 5 which is the main drive shaft of the motor. A suitable bearing assembly 6 for an end of the shaft 5 is carried in an end bell 7 secured over an end of the housing 1. The motor shaft projects into a frame or casing 8, connected to the opposite end of the shell 1, and which contains the apparatus the motor is intended to operate, and which forms no part of the instant invention. Obviously, additional bearings for the motor shaft 5 may be arranged wherever deemed necessary.

The braking mechanism is disposed within the shell 1 and the casing 8 on the motor side of a transverse wall 9 apertured to accommodate the shaft 5. This mechanism includes a plurality of rotary discs 10, each of which has a friction washer 11 secured in any suitable manner to each side face of the disc. Each disc 10 is centrally apertured and splined as indicated at 12 for slidable as well as rotary driving engagement with a splined hub 13 pressed on the rotor shaft 5 and driven by way of a Woodruff key 14 or in an equivalent manner.

Alternating with the rotary discs 10 is a plurality of non-rotary discs 15, there being one more non-rotary disc than there are rotary discs, so as to have a non-rotary disc on the motor side of the assembly. Of course, any number of rotary and non-rotary discs may be utilized as may be deemed necessary, and for purposes of convenience, the disc adjacent the motor will be referred to as the first non-rotary disc. Each non-rotary disc is centrally apertured as at 16 to provide an opening for the disc to clear the aforesaid splined hub 13, since all of the discs are slidable relatively to the hub and axially of the shaft 5. In order to prevent rotation of the discs 15, a pair of bolts 17—17 are fixed into the partition 9 at diametrally opposed locations. Each of the discs 15 is provided with a pair of notches 18—18 therein to partially embrace the bolts 17—17, and it will be noted from the showing in FIGURES 1 and 2 that the notches do not snugly fit the bolts but are sized to leave a little clearance between the disc and the bolt. This arrangement provides slight lost motion that allows a disc to slightly tip relatively tip relatively to the bolts 17—17 in the event such tipping is necessary for maximum contact between a plunger to be later described and the stator laminations 2 when the braking means are released.

All of the discs are constantly urged into compact face-to-face relationship whereby the friction washers will lock the discs and prevent rotation of the shaft 5 by a coil spring 19. This spring is contained in a cage comprising a pair of diametrally opposed legs 20—20 bent intermediately as at 21 and having their outer ends secured to the fixed bolts 17—17. The other ends of these legs are integrally connected by an annular ring 22, the entire cage being a simple form of stamping. The spring 19 abuts the first of the non-rotary discs 15 at one end and bears against the ring 22 at the other end. The spring is compressed or preloaded to a desired extent and constantly urges the discs toward the partition 9.

In order to cause separation of the discs and thus release the braking action on the shaft 5, a cylindrical plunger 23 of ferro-magnetic material is provided. At diametrally opposed locations, this plunger is provided with notches 24 through which the legs 20—20 of the spring cage may extend. At one end thereof the plunger is secured to the first non-rotary disc 15 by means of a series of bolts 25 as clearly seen in FIGURE 3, and the plunger is provided with apertures 26 in the side walls thereof to permit access to the bolts. At the inner or free end thereof the plunger is shaped to clear the motor rotor 4, and provide a narrow annular flat face 27 for engagement with the stator laminations 2 when the rotor is energized.

In operation the structure above described is extremely simple, positive, and effective. As soon as the motor is energized, a magnetic field is established in the stator and rotor which is sufficiently strong to draw the plunger toward the stator against the action of the spring 19, thereby releasing the braking discs. This movement of the plunger, of course, forcibly slides the first non-rotary disc 15 away from the adjacent rotary disc 10 insuring an extremely quick release of the braking means. When the motor is deenergized, the spring 19 immediately forces the discs into positive contact with each other providing braking action holding the shaft 5 against rotation.

It will be noted that in its movement to and from braking position, the plunger is not subjected to any sliding friction since it is freely suspended from the first non-rotary disc 15. There may be some sliding friction between that first non-rotary disc and the bolts 17—17 but due to the short distance a disc moves axially of the shaft, that friction is substantially negligible, and is further reduced due to the clearance between the notches 18—18 in the non-rotary discs and the bolts 17—17.

It should also be noted that the aforesaid clearance permits a slight tipping or tilting of the brake discs relatively to the bolts 17—17 so that a maximum engagement of the face 27 of the plunger with the rotor stator is insured. That fact, coupled with the fact that no special guiding means need to be provided for the plunger to keep it concentric with the shaft 5, owing to its attachment to the first non-rotary disc, eliminates fine machining and trueing of surfaces on the plunger, since its maximum contact with the stator without such fine machining and finishing of surfaces is sufficient to keep the plunger against the stator under all conditions of motor operation.

A further feature of the instant invention resides in the large reduction in both axial inertia of the brake parts and rotating inertia when compared with braking mechanisms heretofore used, and particularly where cone type brake elements were utilized. The instant construction both speeds the action of the brake and materially reduces the hammer blow or pounding action, the reduction of which lengthens the life of the parts.

Still another advantage is a very considerable cost reduction owing to the few parts utilized in the braking mechanism, in view of the fact that the braking discs as well as the spring cage may be simple stampings and in view of the elimination of much of the machining and finishing operations heretofore found necessary.

The second illustrated embodiment of the instant invention, illustrated in FIGURES 4 and 5, differs from the previously described embodiment mainly in the fact that the plunger and brake applying spring both rotate along with the rotor of the motor, whereas in the previously described embodiment, both the plunger and brake applying spring are held against rotation. This second embodiment of the invention is housed as above described and utilizes the same type of rotary and non-rotary braking discs 10 and 15 as above described.

In this instance, the motor embodies stator laminations 28 and a stator coil 29, both held stationary within the shell 1, as well as a rotor 30. The rotor is, of course, keyed to the motor shaft 31 in a known manner. The motor shaft is provided with a splined hub 32 of the same character as the hub 13 previously described connected to the shaft by a Woodruff key 33 or in an equivalent manner. The braking discs 10 and 15 are associated with the splined hub 32 as above described, and the non-rotary discs 15 are held against rotation by diametrally opposed pins 34—34 secured to the partition 9.

In this modification of the invention, an added rotary braking disc 35 having a friction washer 36 on the outer face only thereof, is disposed on the motor side of the disc assembly. This disc 35 is the same as the discs 10 except for the elimination of the friction washer on the inner face thereof. Riveted to the disc 35 and projecting inwardly therefrom is a pair of diametrally opposed driving sleeves 37—37 which may satisfactorily be made of nylon.

Between the rotor 30 and the inner disc 35 is a hollow plunger 38 of ferro-magnetic material and which is provided with an inner hub portion 39 slidable on the motor shaft 31. There is a loose fit at 40 between the plunger hub and the shaft 31 to reduce friction between the plunger and the shaft, but the plunger nevertheless is maintained in proper position relatively to the other parts of the structure. The plunger has an outer head or closed wall 41 to provide an interior pocket 42 in which a brake applying compression spring 43 is disposed, one end of the spring bearing against the plunger head, and the other end of the spring bearing against the rotor 30. This spring is preloaded, and constantly urges the plunger outwardly away from the rotor. On the outer face of the plunger head 41 is an annular bead 44 provided with diametral slots or notches 45—45 to receive the aforesaid driving sleeves 37—37 on the braking disc 35. The plunger is forced against the braking disc 35 by the spring 43 and a plurality of like springs 46 interposed between the rotary braking discs 10 and 35 offer a light pressure in opposition to the spring 43 and accomplish the double function of effecting quick brake release and also maintaining the disc 35 squarely against the bead 44 of the plunger at all times so that the sleeves 37—37 may drive the plunger in synchronism with or at the same speed as the motor shaft rotates. Of course, the brake applying spring 43 rotates along with the plunger and the rotor. This arrangement prevents any relative movement of the plunger with respect to the rotor which would tend to wind the spring in either direction.

The inner end of the plunger is shaped to provide an annular flat face 47 adjacent the stator laminations 28, and an annular flat face 48 adjacent the rotor. When the motor is energized, the magnetic field set up therein attracts the plunger and moves it to the left as seen in FIGURE 4, overcoming the spring 43, and the plunger face 48 seats squarely against the rotor. The plunger face 47 does not contact the stator laminations, there being a small space therebetween so that the plunger may freely rotate with the rotor. When the motor is deenergized the magnetic field collapses, and the spring 43 forces the plunger away from the rotor to the position seen in FIGURE 4, compressing the braking discs and holding the motor shaft against rotation.

The embodiment of the invention seen in FIGURES 4 and 5 possesses virtually all of the advantages of the previously described embodiment. In addition, the arrangement of FIGURES 4 and 5 appears to function somewhat more satisfactorily on single phase motors than does the structure of FIGURES 1, 2 and 3. The magnetic field in a single phase motor fluctuates much more violently than that in a polyphase motor and requires a greater damping action which is gained by the action of both the stator magnetic field and the rotor magnetic field on the plunger faces 47 and 48. However, either modification of the invention may be used, if desired with single phase or polyphase motors.

From the foregoing, it will be apparent that we have provided electric motor braking mechanism that embodies few parts, is economical and long lived, quick acting, and in which sliding friction is reduced to a minimum. Further, the brake applying spring is housed in such a manner that it must maintain its original position and cannot be wound in either direction by relative movement between parts. In addition, it will be noted that hammer blow has been considerably reduced if not practically eliminated, and there has been a material reduction in both axial and rotary inertia.

It will be understood that modifications and variations may be effected without departing from the scope of the novel concepts of the present invention.

We claim as our invention:

1. In braking mechanism for an electric motor having a stator, rotor and drive shaft,
   a plurality of rotary and non-rotary braking discs in alternating arrangement,
   all said braking discs being slidable longitudinally of the motor shaft into and out of braking contact with each other,
   means drivingly connecting the rotary discs with the motor shaft,
   said non-rotary discs having aligned diametrically opposed notches therein,
   a pair of fixed pins extending through said notches to hold the non-rotary discs against rotation,
   a cylindrical ferro-magnetic plunger mounted coaxially about said motor shaft and bolted at one end thereof to a first of said non-rotary discs,
   a spring cage coaxially mounted about said motor shaft at least partially within said plunger having opposed legs secured to said pins, and
   a spring coaxially coiled about said motor shaft in said cage bearing against the cage at one end and against said first non-rotary disc at the other end to urge said discs into braking contact and said plunger away from the motor,
   said spring force being overcome by the magnetic field of the motor when energized drawing said plunger into contact with a part of said motor.

2. In braking mechanism for an electric motor having a stator, rotor and drive shaft,
   a plurality of rotary and non-rotary braking discs in alternating arrangement,
   all said braking discs being slidable longitudinally of the motor shaft into and out of braking contact with each other,
   means drivingly connecting the rotary discs with the motor shaft,
   means preventing rotation of said non-rotary discs,
   a cylindrical ferro-magnetic plunger freely suspended from a first of said non-rotary discs coaxially around the motor shaft in spaced relationship therewith,
   said plunger being responsive to the magnetic field of the motor to move into contact with a part thereof when the motor is energized,
   a spring cage coaxially mounted about said motor shaft at least partially within said plunger and secured stationary against axial movement relative thereto, and
   spring means coaxially coiled about said motor shaft compressed within said spring cage against said first of the nonrotary discs and acting axially parallel to said shaft to oppose said plunger movement by providing a lesser force than the motor magnetic field urging said plunger away from the motor and said discs into braking position.

3. In braking mechanism for an electric motor having a stator, rotor and drive shaft,
   a plurality of rotary and non-rotary braking discs in alternating arrangement,
   all said braking discs being slidable longitudinally of the motor shaft into and out of braking contact with each other,
   means drivingly connecting the rotary discs with the motor shaft,
   means preventing rotation of the non-rotary discs,
   a rotary ferro-magnetic plunger formed with a forward wall and a central hub coaxially slidable on said motor shaft to define an annular cavity about said hub extending rearwardly from the inside face of said wall and a coaxial ring raised on the outside face of said wall for seating against the first of said rotary discs having preformed displaced recesses therein,
   said plunger being responsive to the magnetic field of the motor to be drawn rearwardly into contact with the rotor of the motor,
   a spring coaxially coiled within said plunger cavity contained extending between said rotor and said forward wall of said plunger urging said plunger away from the motor,
   means extending raised from the face of the first of said rotary discs engaging the recesses of said plunger ring for driving said plunger in synchronism with the motor shaft, and
   means maintaining constant contact between the plunger and the rotating of said discs.

4. In braking mechanism for an electric motor having a stator, rotor and drive shaft,
   a plurality of rotary and non-rotary braking discs in alternating arrangement,
   all said braking discs being slidable longitudinally of the motor shaft into and out of braking contact with each other,
   means drivingly connecting the rotary discs with the motor shaft,
   means preventing rotation of the non-rotary discs,
   a cylindrical ferro-magnetic plunger coaxially mounted about the motor shaft secured at one end to a non-rotary disc and having a plurality of openings therein,
   a spring cage coaxially mounted about said motor shaft at least partially inside and spaced from said plunger, a plurality of legs on said cage extending through said plunger openings to points of fixed anchorage to fix the position of said cage, a spring coaxially coiled about said motor shaft in said cage bearing against the cage at one end and against a first non-rotary disc at the other end to urge said discs into braking contact and the plunger away from the motor, and said spring being weaker than the attractive force of the magnetic field of the motor and overcome thereby when the motor is energized and the plunger is pulled into contact with a part thereof.

References Cited

UNITED STATES PATENTS

| | | | |
|---|---|---|---|
| 2,809,309 | 10/1957 | Evans | 310—77 |
| 2,911,548 | 11/1959 | Joy | 310—77 |
| 3,037,133 | 5/1962 | Peach | 310—77 |

FOREIGN PATENTS

| | | |
|---|---|---|
| 237,745 | 5/1960 | Australia. |
| 1,007,316 | 5/1952 | France. |
| 1,190,041 | 10/1959 | France. |

MILTON O. HIRSHFIELD, *Primary Examiner.*

J. D. MILLER, *Assistant Examiner.*